US007428571B2

(12) United States Patent
Ichimura

(10) Patent No.: US 7,428,571 B2
(45) Date of Patent: Sep. 23, 2008

(54) METHOD OF OPERATING A GATEWAY WITH A LOCATION INFORMATION SYSTEM

(75) Inventor: Shigehiro Ichimura, Tokyo (JP)

(73) Assignee: NEC Corporation, Tokyo (JP)

( * ) Notice: Subject to any disclaimer, the term of this patent is extended or adjusted under 35 U.S.C. 154(b) by 838 days.

(21) Appl. No.: 10/411,342

(22) Filed: Apr. 11, 2003

(65) Prior Publication Data

US 2004/0003125 A1    Jan. 1, 2004

(30) Foreign Application Priority Data

Apr. 11, 2002    (JP)    ............... 2002-108968

(51) Int. Cl.
  G06F 15/16    (2006.01)
  H04M 3/42    (2006.01)
(52) U.S. Cl. ............... 709/203; 709/201; 709/204; 709/205; 709/206; 379/201.01
(58) Field of Classification Search ............ 379/201.01, 379/201; 709/221, 201, 204, 205, 206
  See application file for complete search history.

(56) References Cited

U.S. PATENT DOCUMENTS

| 7,061,923 | B2 * | 6/2006 | Dugan et al. | ............... 370/396 |
| 7,096,007 | B2 * | 8/2006 | Ramaswamy et al. | ..... 455/414.1 |
| 7,191,170 | B2 * | 3/2007 | Ganguly et al. | ............... 707/2 |
| 2001/0044309 | A1 | 11/2001 | Bar et al. | |
| 2002/0062375 | A1 * | 5/2002 | Teodosiu et al. | ............ 709/226 |

(Continued)

FOREIGN PATENT DOCUMENTS

EP    0 993 155 A2    4/2000

(Continued)

OTHER PUBLICATIONS

"Digital cellular telecommunications system (Phase 2+); Location Services (LCS); Functional description; Stage 2 (3GPP TS 03.71 version 7.9.0 Release 1998); ETSI TS 101 724" ETSI Standards, European Telecommunications Standards Institute, Sophia-Antipo, FR. vol. 3-SA2; SMG3, No. V790, Mar. 2002, XP014006568.

(Continued)

Primary Examiner—John Follansbee
Assistant Examiner—Karen C Tang
(74) Attorney, Agent, or Firm—Young & Thompson

(57) ABSTRACT

In response to a first location request message from a client terminal, a gateway stores the message and requests the location information of a target mobile terminal from a location information system. If a second location request message is received from other client terminal requesting the location information of the same mobile terminal while the initial client terminal is waiting for the requested information, the second location request message is stored. Reply messages are sent simultaneously to these client terminals when the requested information is received. In a modified embodiment, if location request messages are received from multiple client terminals for the same target mobile terminal, they are stored in a memory, which is then searched at periodic intervals. If the message of at least one client terminal is detected, the gateway acquires location information of the target terminal from the system and transmits a reply message to client terminals.

22 Claims, 11 Drawing Sheets

U.S. PATENT DOCUMENTS

| | | | |
|---|---|---|---|
| 2003/0101225 A1* | 5/2003 | Han et al. | 709/206 |
| 2003/0187931 A1* | 10/2003 | Olsen et al. | 709/205 |
| 2004/0198386 A1* | 10/2004 | Dupray | 455/456.1 |
| 2005/0198109 A1* | 9/2005 | Teodosiu et al. | 709/201 |

FOREIGN PATENT DOCUMENTS

| | | | |
|---|---|---|---|
| JP | 5-83189 | | 4/1993 |
| SE | WO99/45533 | * | 2/1999 |
| WO | WO 99/45533 | | 9/1999 |
| WO | WO 00/25545 | | 5/2000 |
| WO | WO 01/91485 | | 11/2001 |
| WO | WO 02/21873 | | 3/2002 |

OTHER PUBLICATIONS

Striegel, A. et al., "A protocol independent internet gateway for ad hoc wireless networks" Local Computer Networks, 2001. Proceedings. LCN 2001. 26th Annual IEEE Conferrence On Nov. 14-16, 2001, Piscataway, NJ, USA, IEEE, Nov. 14, 2001, pp. 92-101, XP010584020.

* cited by examiner

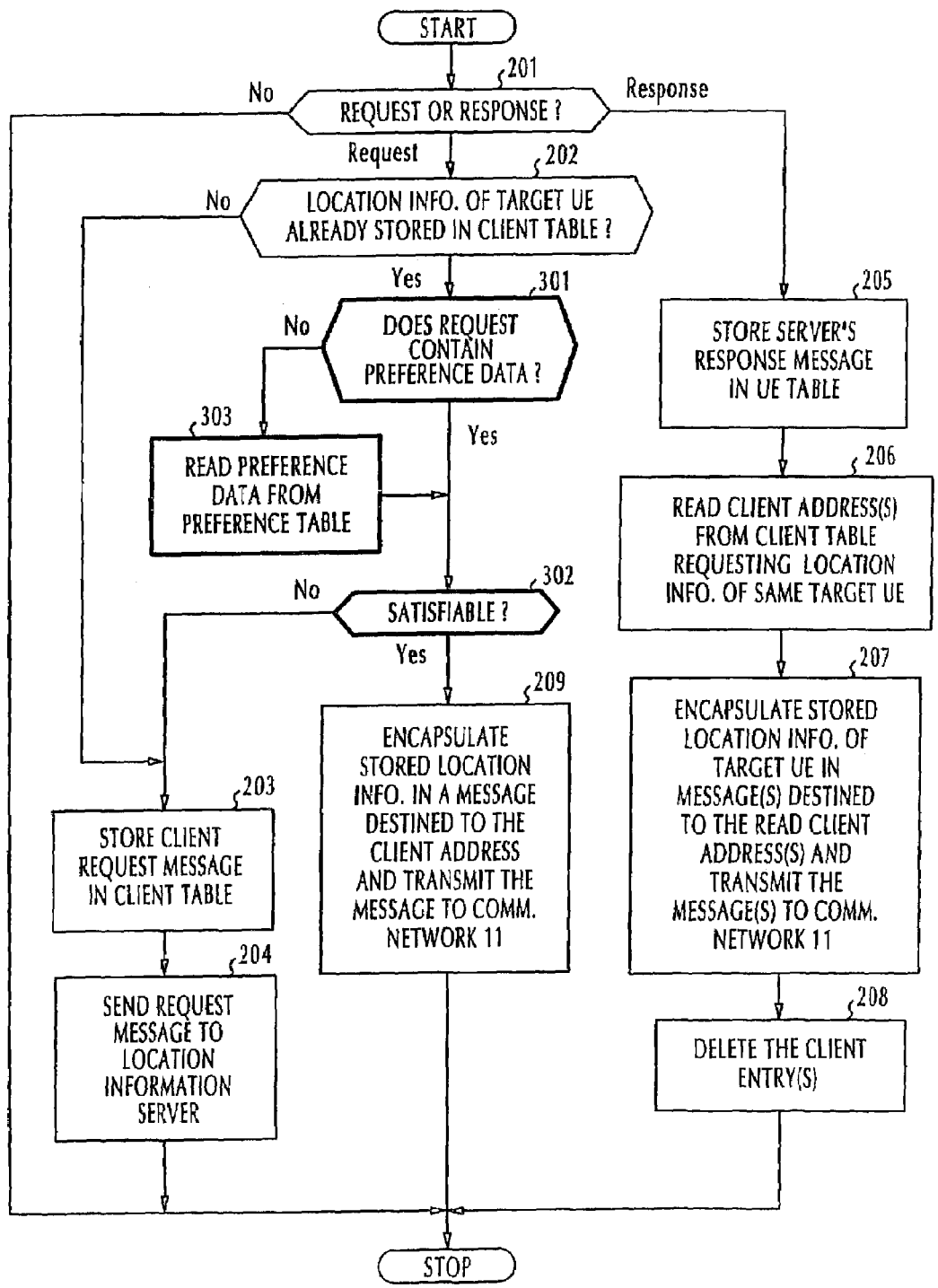

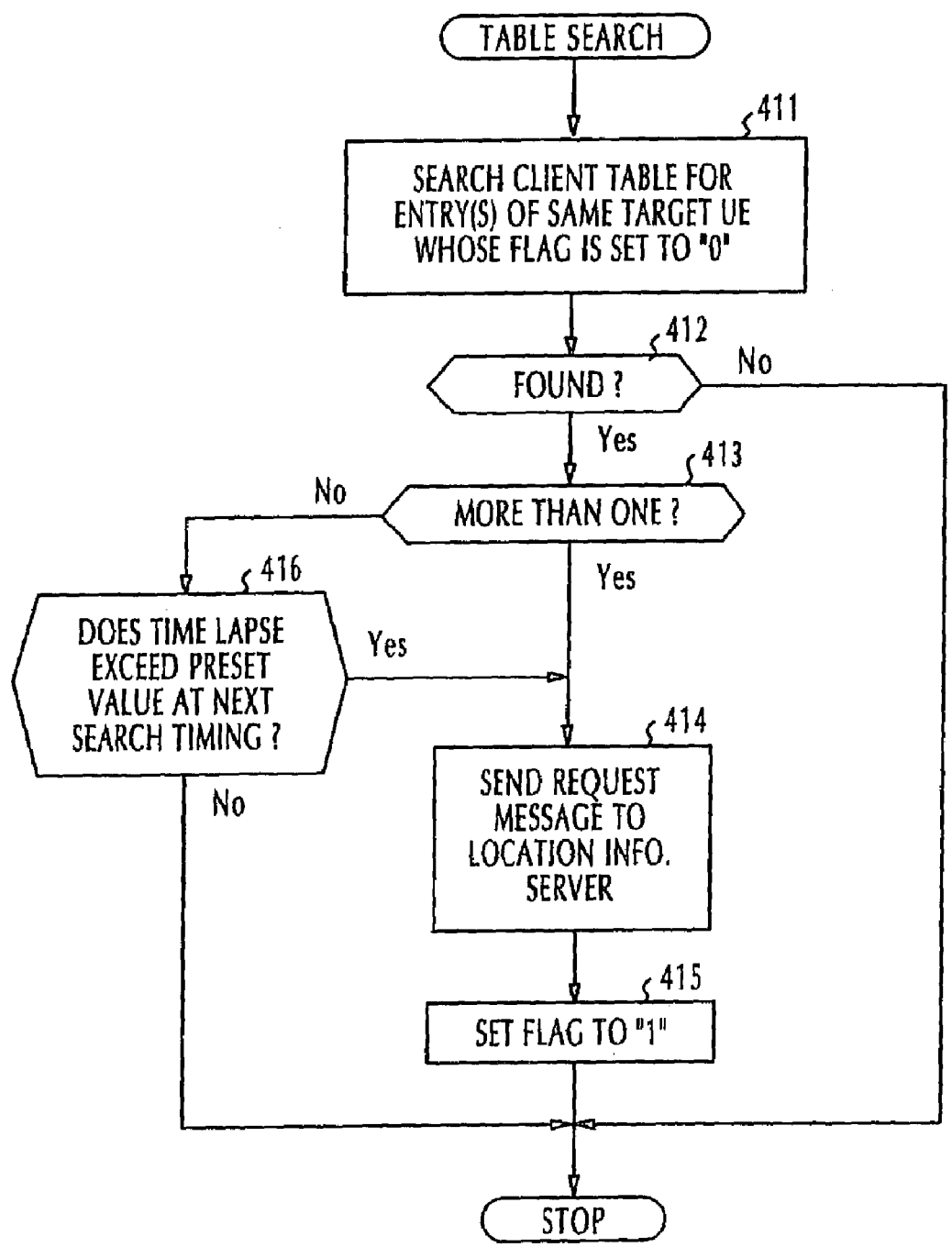

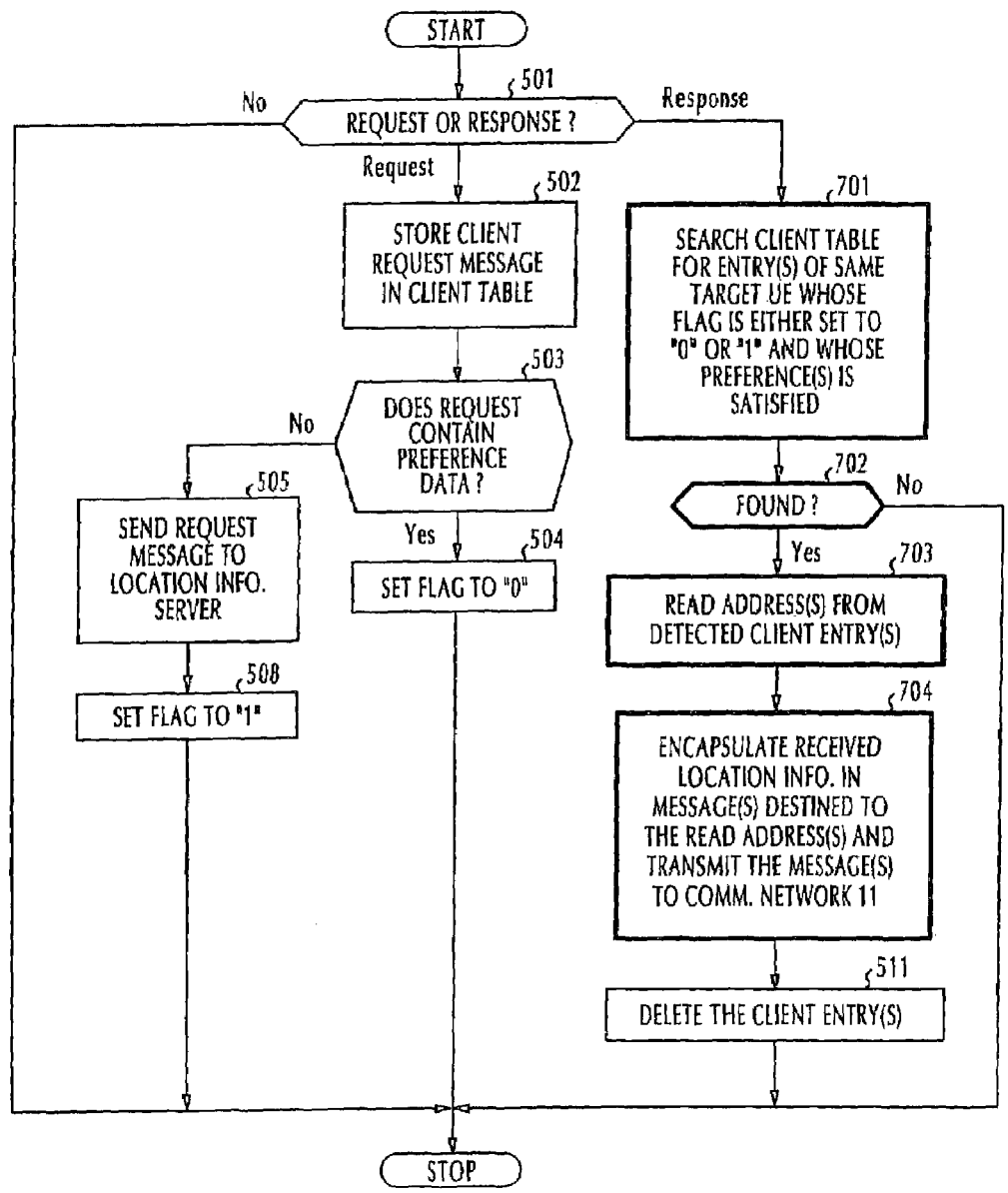

METHOD OF OPERATING A GATEWAY WITH A LOCATION INFORMATION SYSTEM

BACKGROUND OF THE INVENTION

1. Field of the Invention

The present invention relates generally to location information systems, and more specifically to a gateway which interfaces between client terminals and a location information system.

2. Description of the Related Art

According to the state-of-the-art location information system, a client terminal sends a location request message to a gateway of a wireless access network when the client desires the location information of a target mobile user equipment (UE) terminal. In response to the client request message, the gateway stores the address of the client terminal in a management table and assigns a serial number and requests the access network to establish a connection to a location information server. The gateway sends a request message to the location information server, containing the address of the target UE terminal and the serial number. Using a global or local positioning system, the location information server obtains the location information of the target UE and transmits this information in a location response message to the gateway, containing the serial number. In response, the gateway searches the management table for a client terminal assigned the same serial number as that of the received response message and transmits the received location information to the client terminal.

Therefore, for every client's location request, the state-of-the-art gateway sends a request to the location information server, regardless of whether there is another client's request requesting the location information of the same mobile terminal. Since the acquisition of location information is a costly process, there exists a need to reduce the acquisition cost when the location information of a mobile terminal is requested simultaneously from a number of client terminals.

SUMMARY OF THE INVENTION

It is therefore an object of the present invention to reduce the acquisition cost of location information using a global or local positioning system by sending a smaller number of request messages from a gateway to a location information system if the gateway receives location request messages almost simultaneously from client terminals greater in number than the messages the gateway transmitted to the location information system.

In general terms, the present invention provides a method of operating a gateway with a location information system. The method comprises a step of performing, on a real-time basis, reception of a plurality of location request messages from a plurality of client terminals requesting location information of a common mobile terminal, acquisition of the requested information from the location information system in one transaction and transmission of a plurality of reply messages, each containing the acquired information, to the client terminals.

According to a first aspect of the present invention, the location request messages are received within a time interval during which said requested information is acquired from said system. Preferably, the requested location information is acquired from the location information system immediately following the receipt of a location request message which arrived first in that time interval.

Further, in a preferred form of the present invention, the method comprises (a) receiving a location request message from a client terminal concerning location information of the mobile terminal, (b) creating a client entry in a memory for mapping the address of the client terminal to the mobile terminal, (c) repeating steps (a) and (b) until the requested information is acquired from the location information system if location information of the same mobile terminal is requested by a subsequent location request message from a further client terminal, so that a plurality of client entries are created in the memory, and (d) reading a plurality of addresses from the memory when the location information is acquired from the location information system, encapsulating the acquired information in reply messages destined to the read addresses and transmitting the reply messages.

In a modified form of the present invention, the acquired location information of a mobile terminal is stored in a memory. If a location request message is received from a further client terminal, the stored information is transmitted to the further client terminal if the location request message is requesting location information of the same mobile terminal as one that is requested previously.

According to a second aspect of the present invention, there is provided a method of operating a gateway with a location information system, comprising the steps of (a) receiving a location request message from a client terminal concerning location information of a mobile terminal, (b) acquiring the location information from said system, (c) transmitting the acquired information to the client terminal and storing the acquired information in a memory, and (d) receiving a further location request message from a client terminal, repeating steps (b) and (c) if the further location request message concerns location information of a mobile terminal unless the location information of said mobile terminal is stored in the memory, and transmitting the stored information to the client terminal if the further location request message concerns the location information stored in the memory.

According to a third aspect, the present invention provides a method of operating a gateway with a location information system, comprising the steps of receiving a plurality of location request messages from a plurality of client terminals for location information of a mobile terminal, and holding the location request messages in a memory, and making a search through the memory at periodic intervals for detecting at least one location request message, requesting the location information of the mobile terminal from the location information system if at least one location request message is detected in the memory, and transmitting a reply message to the client terminal from which the detected message is received and deleting the detected message from the memory.

The information acquired from the information location system may indicate auxiliary information of the mobile terminal. The acquired information is transmitted to a client terminal if the auxiliary information satisfies a condition specified by the location request message. Each of the client terminals may include preference data. If the auxiliary information satisfies the preference data of a client terminal, the acquired information is transmitted to the client terminal. The preference data may be stored in a memory. The acquired information is transmitted to a client terminal if the auxiliary information satisfies the stored preference data. The preference data may indicate a degree of accuracy of the acquired information desired by the client terminal and/or an age of the acquired information desired by the client terminal. The auxiliary information may indicate a travelling speed of the mobile terminal and/or a degree of accuracy of the acquired information, and/or a time of day at which the acquired location information is received from said system.

BRIEF DESCRIPTION OF THE DRAWINGS

The present invention will be described in detail further with reference to the following drawings, in which:

FIG. 5 is a flowchart of a modification of FIG. 4;

FIGS. 6A and 6B are flowcharts of the operation of the gateway according to a third embodiment of the present invention;

FIGS. 8 and 9 are flowcharts of modifications of FIG. 7A.

DETAILED DESCRIPTION

Figure 1:
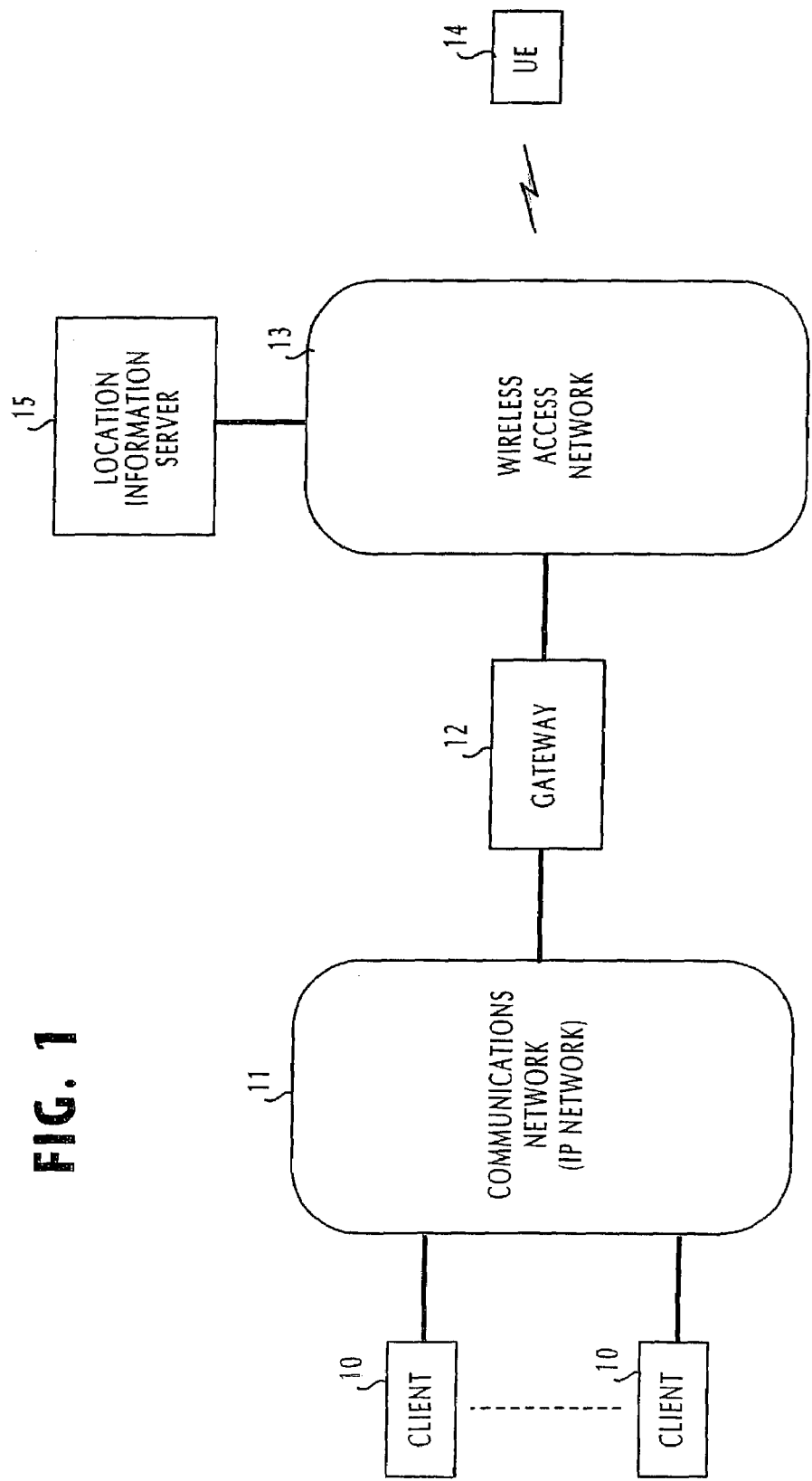
FIG. 1 is a block diagram of a location information network of the present invention.

In a location system of the present invention, shown in FIG. 1, a plurality of client terminals 10 are connected through a communications network 11, such as an IP network, to a gateway 12, which is connected to a wireless access network 13. Wireless access network 13, which serves a wireless UE (user equipment) terminal 14, is connected to a location information server 15. Access network 13 establishes a connection between the gateway 12 and the location information server 15 and a connection between the location information server 15 and the UE terminal 14.

Wireless UE terminal 14 is equipped with a GPS (Global Positioning System) transceiver which responds to a request from the location information server 15 by receiving signals from GPS satellites. Using the received GPS signals, the GPS transceiver of the UE terminal calculates its location and sends a reply to the location information server 15.

Alternatively, the location information of a target UE terminal can be obtained by the location information server 15 requesting a number of wireless cell-sites to report the transmission losses of signals received from the target UE terminal. The position of the target UE relative to the cell-sites is determined by calculating the reported transmission losses.

Client terminals 10 may be terminals of an application service provider (ASP). ASP operators enter location request data into their client terminal to formulate a location request message with the address of a target UE specified by a client user and send the message to the gateway 12. Gateway 12 receives such a location request message from one or more client terminals 10 and transmits the request message to the location information server 15 via the wireless access network 13. If the UE terminal 14 is targeted, the location information server 15 sends a request to the target UE to obtain its location information and sends back a location response message containing the location information of the target UE terminal to the gateway 12. The location information is extracted by the gateway from the response message and transmitted to one or more requesting client terminals 10, where the position of the target UE is indicated in a map displayed on a display screen.

Figure 2:
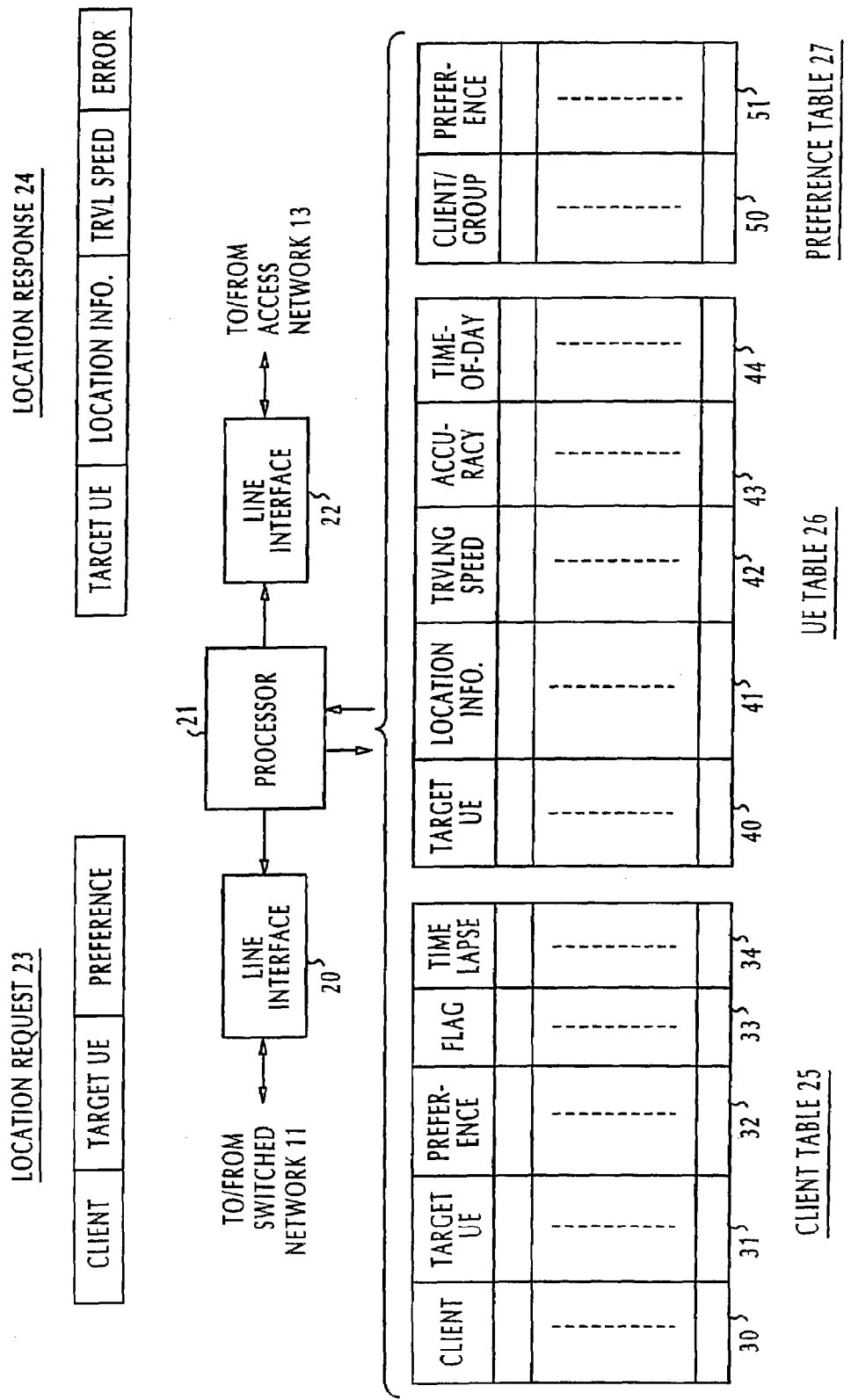
FIG. 2 is a block diagram of a gateway of the location information network configured according to the present invention.

As shown in detail in FIG. 2, the gateway 12 is comprised of a processor 21, which is connected to the networks 11 and 13 via line interfaces 20 and 21 for receiving a client's location request message 23 from the communication network 11 and receiving a UE's location response message 24 from the access network 13. The messages received from the client terminals and the server are stored and processed in a manner as will be described in detail later.

Location request message 23 of a client terminal includes its address and the address of a target UE terminal and may additionally include preference data. The preference data can be used by a requesting client to specify a requested age of location information and requested accuracy of the location information. If the request message contains such preference data, it can be used as decision criteria for transmitting stored location information of the target UE terminal to the requesting client.

If the preference data includes requested age of location information and if the amount of time lapsed from the instant the gateway received it from the server satisfies the requested age, the gateway may transmit the stored information to the client terminal. Also if the preference data includes requested accuracy and if the accuracy information of the stored location information satisfies the requested degree of accuracy, the gateway may transmit the stored information to the client terminal.

On the other hand, the location response message 24 from the location information server 15 includes the address of a target UE terminal, location information of the target UE terminal, the travelling speed of the UE terminal, and the accuracy of the measured location information.

In FIG. 2, the processor 21 is associated with a client table 25, a UE table 26 and a preference table 27. Client table 25 has a plurality of entries respectively corresponding to location request messages. Each entry of the client table 25 includes a plurality of fields for storing the addresses of the requesting client terminal and the target UE of a received request message in address fields 30 and 31. If preference data is contained in the received location request message, it is stored in a preference field 32.

Further, each entry has a flag field 33 for setting an indication of whether or not a request has been transmitted from the gateway to the location information server. Each entry has a time lapse field 34. When the flag field 33 of an entry is used in a manner as will be described, a time lapse indication is set in the time lapse field 34 of this entry.

UE table 26 has a plurality of entries respectively corresponding to location response messages 24. Each entry of the UE table 26 includes a plurality of fields for storing the address of a target UE terminal in an address field 40, the location information of the UE terminal in a location information field 41, the travelling speed of a target UE terminal in a travelling speed field 42, the accuracy of the location information in an accuracy field 43. Each entry of the table 26 has a time-of-day field 44 for setting the time of day at which the entry is created in response to receipt of a location response message from the server 15.

Preference table 27 is divided into a plurality of entries corresponding to individual client terminals or groups of individual client terminals. Each entry includes an address field 50 for indicating the client terminal or group, and a preference field 51 for storing preference data. The preference data specifies default setting of the requested accuracy and age of location information, instead of the individual client terminals specifying their preferences in each location request. Preference table 27 will be used when the client's preference data is not contained in a received location request message.

Figure 3:
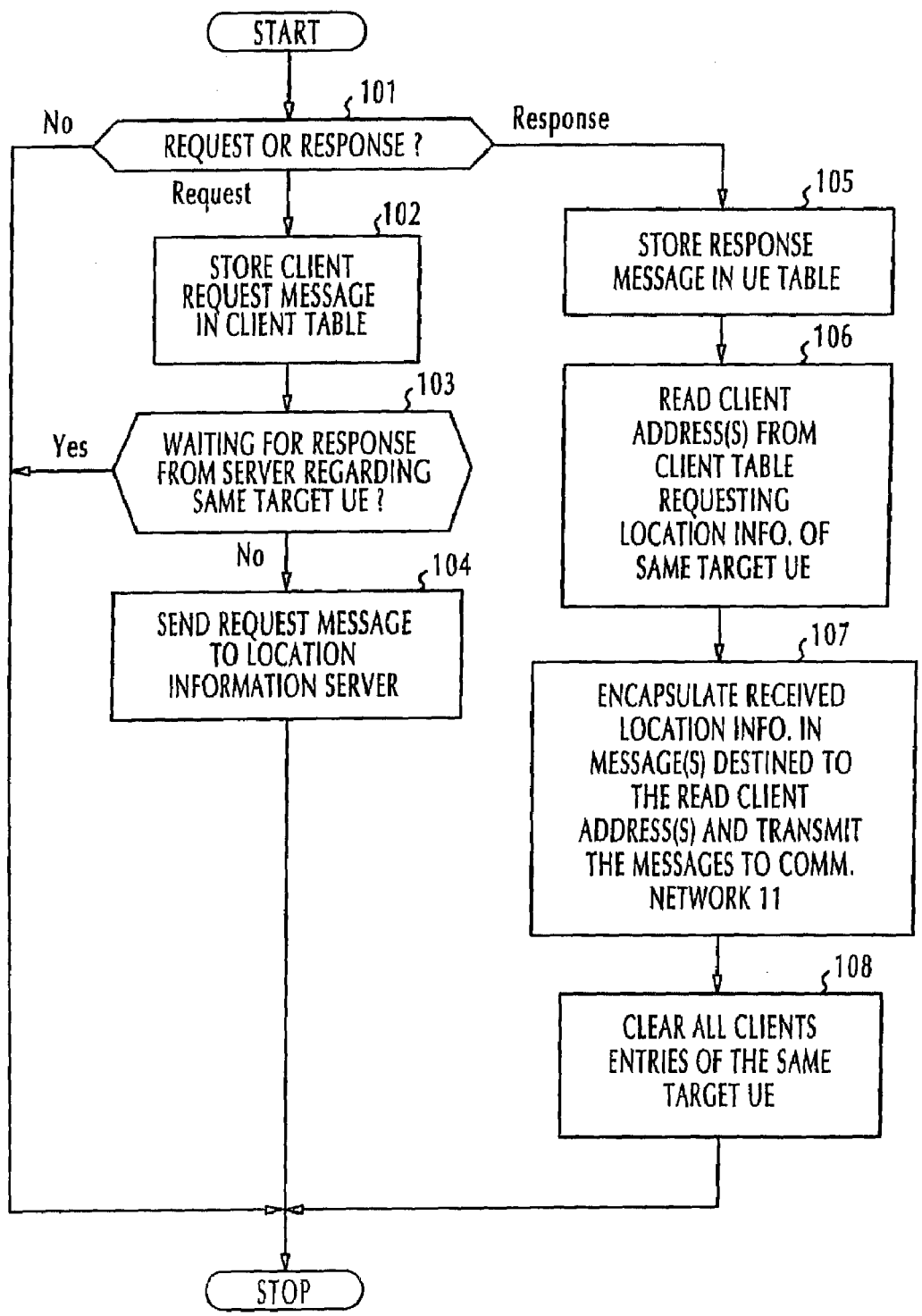
FIG. 3 is a flowchart of the operation of the gateway according to a first embodiment of the present invention.

In a first embodiment of the present invention, the processor 21 operates according to the flowchart of FIG. 3.

In FIG. 3, the operation of the routine begins with decision step 101 when a location request message is received from a client terminal 10 or a location response message is received from the location information server 15. In response, the processor 21 checks to see if the message is from a client terminal 10 or from the location information server 15. If the received message is from a client terminal, flow proceeds to step 102 to store the message in a vacant entry of the client table 25. At decision step 103, the processor checks the client table 25 and determines whether the processor is waiting for a response from the server 15 regarding the same target UE terminal. If the processor is not waiting for a response from the server 15 regarding the same target UE terminal, flow proceeds to step 104 to transmit a request message to the location information server 15 and terminates the routine. If the processor is waiting for a response from the server 15 regarding the same target UE terminal, the decision is affirmative at step 103 and flow proceeds to the end of the routine without sending a further request to the location information server.

If the received message is a location response from the location information server, flow proceeds from step 101 to step 105 to store the received response message in a vacant entry of the UE table 26. At step 106, the processor reads the client address from all entries of the client table 25 requesting the location information of the same target UE terminal. Processor 21 encapsulates the location information of the target UE in each of a plurality of reply messages respectively destined to the retrieved client addresses and transmits the reply messages to the communication network 11. As a result, the reply messages are sent to all the client terminals simultaneously requesting the location information of the same target UE terminal. At step 108, all client entries regarding the same target UE terminal are deleted from the client table 25.

In this way, the gateway requires only one transaction with the location information server 15 even if a number of location request messages are received from client terminals, provided that they occur during a period the gateway is waiting for a response from the server 15.

Each entry of the UE table 26 has a cache memory function. Processor 21 constantly monitors the time lapse of each UE table entry to detect when the entry has run out of a predetermined time-out period. When this occurs, the processor clears this entry from the UE table 26.

In so far as waiting request messages of the present embodiment are concerned, it is not necessary to store a location response message in the UE table 26 at step 105. However, it is advantageous to use the stored location information of a UE entry for request messages which may arrive before the UE entry is cleared.

Figure 4:
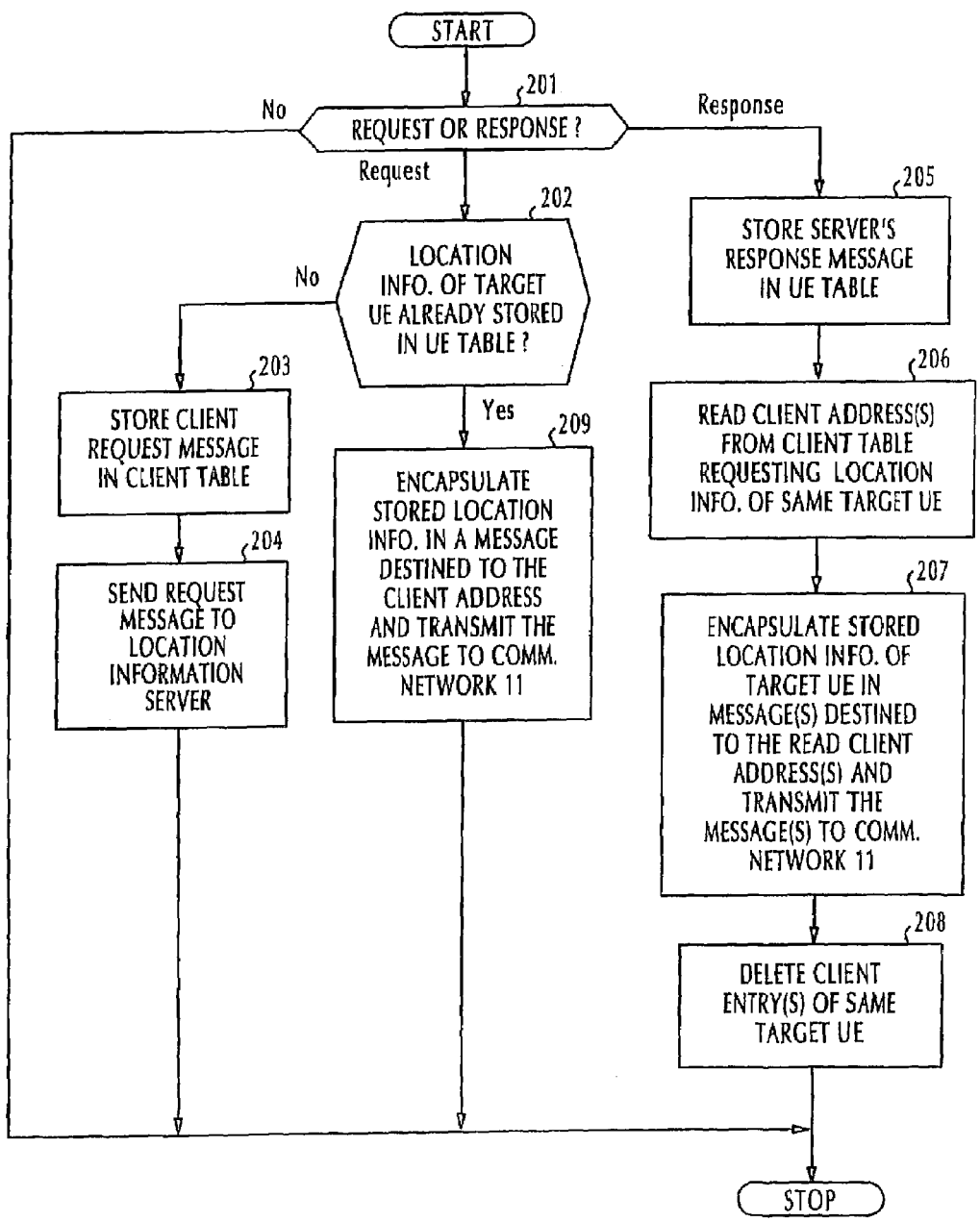
FIG. 4 is a flowchart of the operation of the gateway according to a second embodiment of the present invention.

In a second embodiment of the present invention, the processor 21 operates according to the flowchart of FIG. 4.

In FIG. 4, the operation of the routine begins with decision step 201 when either a request message or a response message is received. In response, the processor 21 checks to see if the message is from a client terminal 10 or from the location information server 15. If the received message is from a client terminal, requesting the location information of a given target UE, flow proceeds to step 202 to determine whether the requested location information of the target UE is stored in the UE table 26. If the requested location information of the target UE is not stored in the UE table 26, the decision at step 202 is negative, and the processor proceeds to step 203 to store the client's request message in a vacant entry of the client table 25. At step 204, the processor 21 transmits a request message to the location information server 15, and waits for a location response message.

If it is determined, at step 201, that a location response message is received from the server, flow proceeds to step 205 to store the received location information in a vacant entry of the UE table 26, and proceeds to step 206. In step 206, the processor will read a client address from the client table 25 and encapsulates the stored location information in respective response message destined to the client address and transmits the message to the network 11 (step 207). At step 208, the entry of the client terminal in client table 25 to which the response message has been transmitted is cleared.

If the location information of a target UE is stored in the UE table at the instant a location request for the same target UE terminal is received, the decision at step 202 is affirmative and the processor proceeds to step 209 to encapsulate the stored location information in a reply message destined to the client address and transmits the message to the network 11, and terminates the routine.

If a client terminal transmits a location request which contains reference data, the processor 21 operates according the flowchart of FIG. 5, in which parts corresponding to those in FIG. 4 are marked with the same numerals as those of FIG. 4 and the description thereof is not repeated.

FIG. 5 differs from the flowchart of FIG. 4 in that step 202 is followed by step 301 which is executed if step 202 determines that the location information of a target UE terminal is already stored in the UE table 26. If the received request message contains reference data (step 301), flow proceeds to step 302 to determine whether the data indicated in one or more of traveling speed field 42, accuracy field 43 and time-of-day field 44 is satisfied by a condition specified by the client's preference data.

If the client's preference data specifies a requested age of location information, the processor checks to see if the timing data stored in the time-of-day field 44 satisfies the requested age. For example, if the requested age indicates 5 minutes past to the current time instant and if the data stored in the time-of-day field 44 of an entry indicates that it was created 3 minutes past of the current time, then the processor determines that the stored location information satisfies the requested age of location information.

If the client's preference data specifies a requested accuracy of 500 meters, for example, the processor checks to see if the target UE terminal is within the requested accuracy by calculating the data stored in the travelling speed field 42 and the measured accuracy field 43. If the fields 42 and 43 of an entry created at 10 minutes past of the current time indicate that the travelling speed of the target UE terminal is 10 meters per second and the measured accuracy is 5 meters, the processor 21 calculates that the target UE terminal has traveled a distance of 100 meters so that its current location is with an accuracy of 105 meters (=5+100). This satisfies the requested accuracy of 500 meters.

If the decision at step 302 is affirmative, the location information of the target UE terminal is read out of the UE table and encapsulated in a message destined to the requesting client address and transmitted to the communication network 11 (step 209). If the decision at step 302 is negative, flow proceeds to step 203 to store the received request message into a vacant entry of the client table 25 and a request message is transmitted from the gateway to the location information server 15 via the access network.

If the received location request message does not contain preference data, the decision at step 301 is negative and flow proceeds to step 303 to read preference data from an entry of the preference table 27 corresponding to the requesting client terminal or client group and the read preference data is checked against the data stored in one or more of the fields 42, 43 and 44 of the UE table 26 (step 302).

Figure 6A:
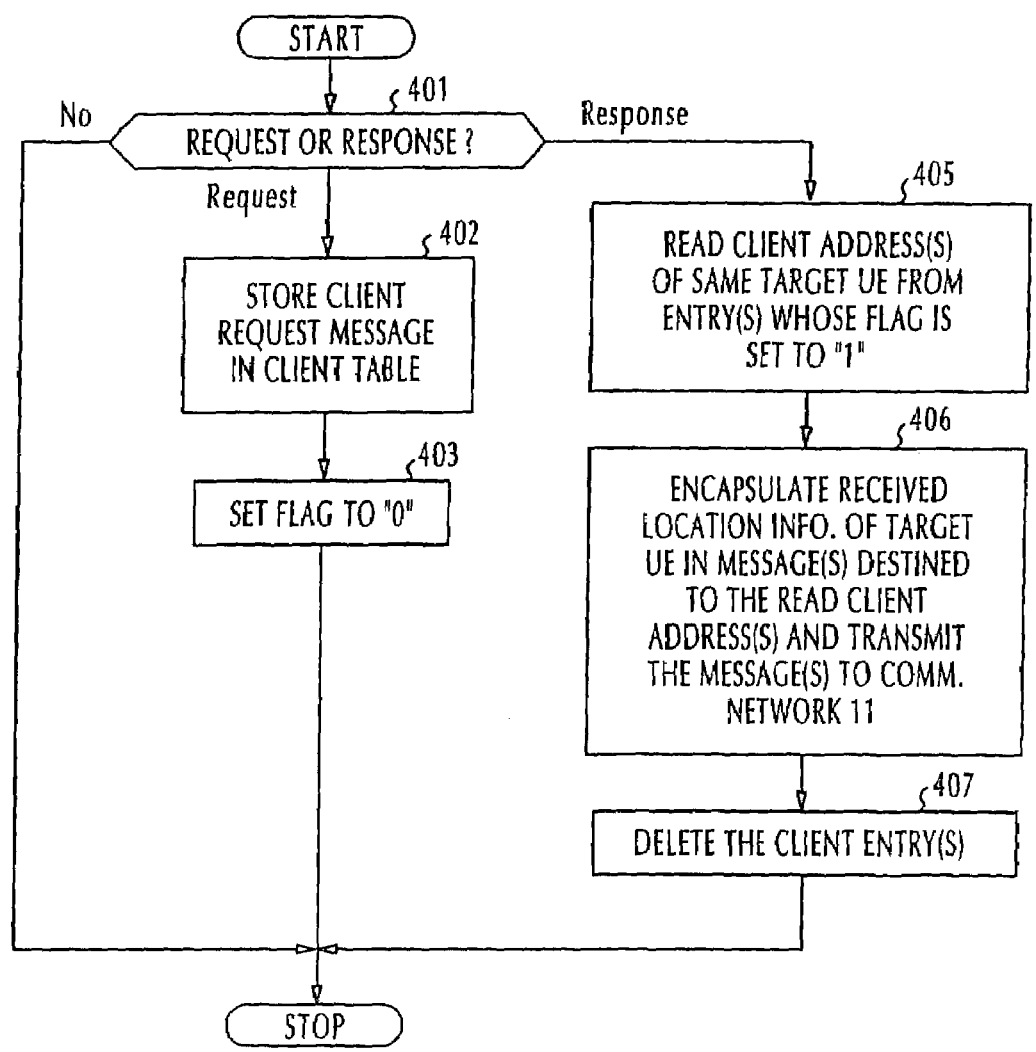

In a third embodiment of the present invention shown in FIGS. 6A and 6B, data stored in the flag field 33 of client table 25 is used for determining whether or not a request message is to be sent from the gateway to the location information server 15.

In FIG. 6A, when a location request message is received from a client terminal 10 (step 401), the request message is stored in a vacant entry of the client table 25 (step 402) and the flag field 33 of this entry is set to "0" for indicating that the client terminal of this entry is waiting for a turn to send a request message from the gateway to the location information server 15.

At periodic intervals, the routine of FIG. 6B is executed for making a search through the client table 25. At step 411, the client table 25 is searched for entries of the same target UE terminal whose flag field is set to "0". If at least one such entry is found in the client table 25 (step 412) and more than one such entry is found (step 413), flow proceeds to step 414 to send a request message to the location information server 15. The flag field of each of the detected entries is set to "1" at step 415, indicating that the requests from the client terminals of these entries have been served. If there is only one entry that is detected at step 412, flow proceeds from step 413 to step 416 to check to see if the time lapse of this entry will exceed a preset value at the next table search timing. If this is the case, flow proceeds to step 414 to send a request message to the location information server and the flag field of the detected entry is set to "1" (step 415). If not, the routine is terminated.

Returning to FIG. 6A, when a location response message is received from the location information server (step 401), the processor proceeds to step 405 to read one or more client addresses of same target UE from the entries whose flag is set to "1" and encapsulates the received location information in one or more messages destined to the read client addresses and transmits them to the communication network 11 (step 406). At step 407, the entries of these client table 25 are deleted.

Figure 7A:
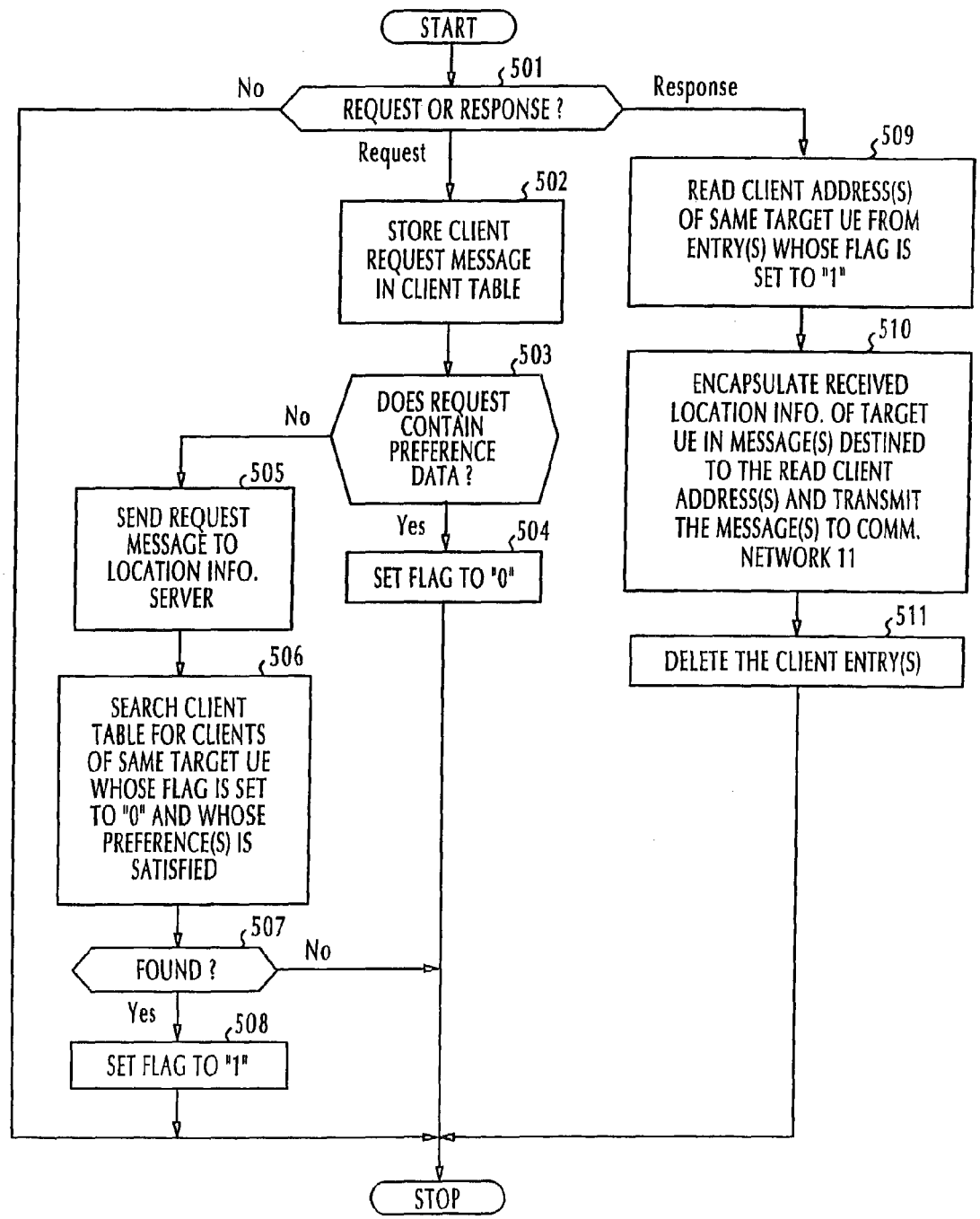
FIGS. 7A and 7B are flowcharts of the operation of the gateway according to a fourth embodiment of the present invention.
Figure 7B:
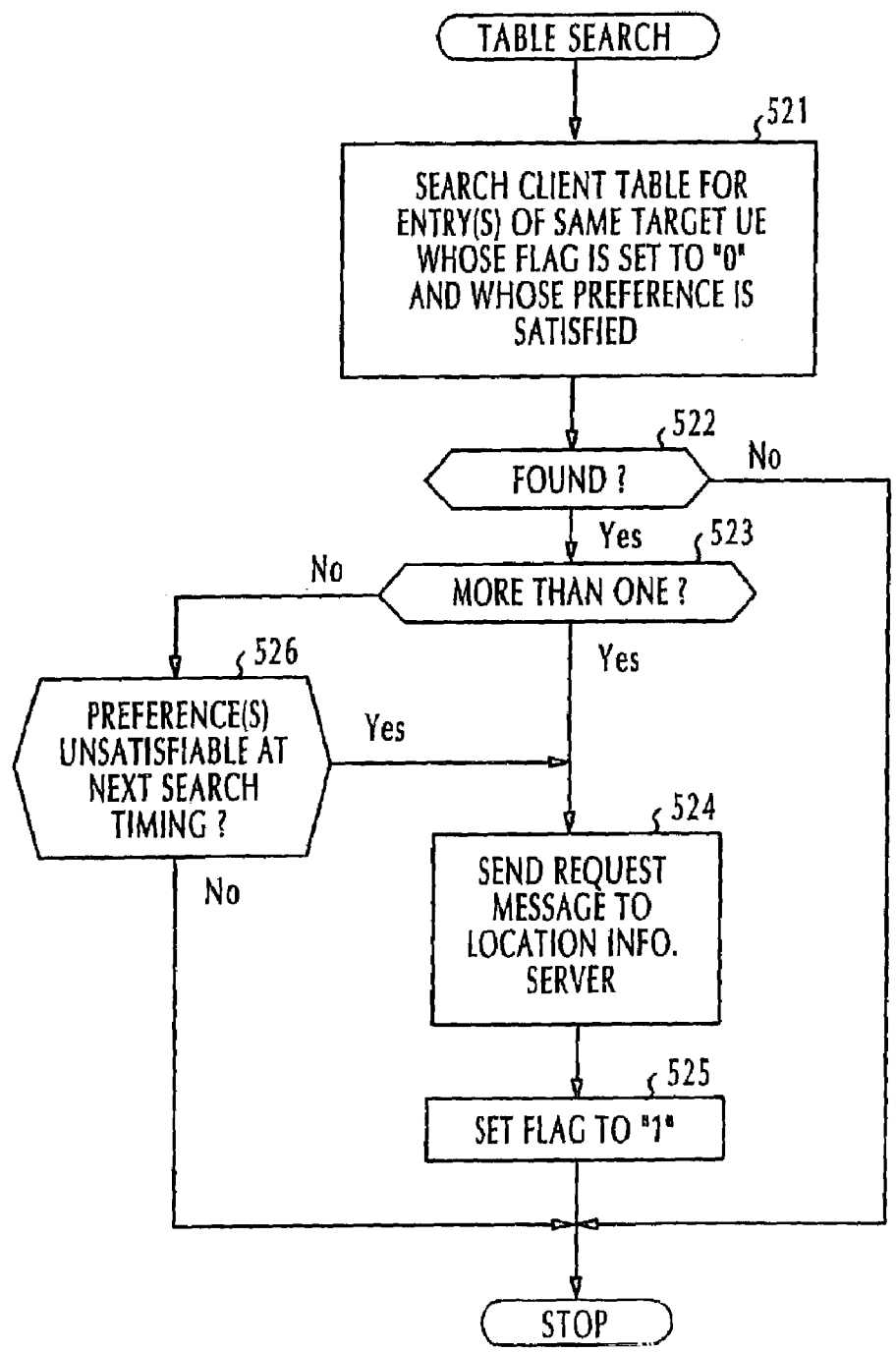

In a fourth embodiment of the present invention shown in FIGS. 7A, 7B, preference data is contained in a location request received from a client terminal as a modification of the embodiment of FIGS. 6A, 6B.

In FIG. 7A, when a location request message is received from a client terminal 10 (step 501), the request message is stored in a vacant entry of the client table 25 (step 502). If the request message contains preference data (step 503), flow proceeds to step 504 to set the flag field 33 of this entry to "0" and the routine is terminated.

It is seen that if location request messages containing preference data are received in rapid succession, steps 501 through 504 will be repeated and a number of entries whose flag is set to "0" will be created in sequence in the client table 25, waiting for a response from the location information server 15. As described below, these client entries will be served by a table search which is performed if a location request message containing no preference data is received.

If the received location request message contains no preference data, flow proceeds from step 503 to step 505 to send a request message from the gateway to the location information server 15. At step 506, the client table 25 is searched for entries of the same target UE terminal whose flag is set to "0" and whose preference data satisfies some decision criteria. If such entries are detected (step 507), the flag field 33 of these entries is set to "1" and the routine is terminated.

In one example, the preference data specifies a time interval in which the client desires to obtain the location information of a target mobile terminal. In this case, the decision criteria is the time instant the table search is performed. Therefore, if step 506 is executed on a flag-zero client entry within the specified time interval, it is determined that client's preference is satisfied.

In response to the transmission of a request message at step 505, a location response message will then be received and detected at step 501. Flow proceeds to step 509 to read one or more addresses of same target UE from the client entries whose flag is set to "1" and encapsulates the received location information in one or more messages destined to the read client addresses and transmits them to the communication network 11 (step 510). At step 511, these entries of the client table 25 are deleted.

If the gateway continuously receives location request messages all containing preference data, steps 501 through 504 are looped and a significant number of flag-zero client entries will be created and remain outstanding in the client table 25. These entries will be served when the routine FIG. 7B is performed.

At periodic intervals, the routine of FIG. 7B is executed for making a search through the client table 25. At step 521, the client table 25 is searched for entries of the same target UE terminal whose flag field is set to "0" and whose preference satisfies the decision criteria. If the preference data specifies a time interval in which the client desires to obtain the location information of a target mobile terminal. The decision criteria is when the table search is performed. Therefore, if step 521 is executed on a flag-zero client entry within the specified time interval, it is determined that client's preference is satisfied.

If more than one such entry is found (steps 525, 523), flow proceeds to step 524 to send a request message to the location information server 15. The flag field of each of the detected entries is set to "1" at step 525. If only one such entry is detected at step 523, flow proceeds to step 526 to check to see if the preference of this entry will be unsatisfied at the next table search timing. If this is the case, flow proceeds to step 524 to send a request message to the location information server. If not, the routine is terminated.

In response to the transmission of the request message at step 524, a location response message is received from the location information server (step 501, FIG. 7A). Flow proceeds to step 509 to read one or more client addresses of same target UE from the entries whose flag is set to "1" and encapsulates the received location information in one or more messages destined to the read client addresses and transmits them to the communication network 11 (step 510). At step 511, the entries of these client table 25 are deleted.

Figure 8:
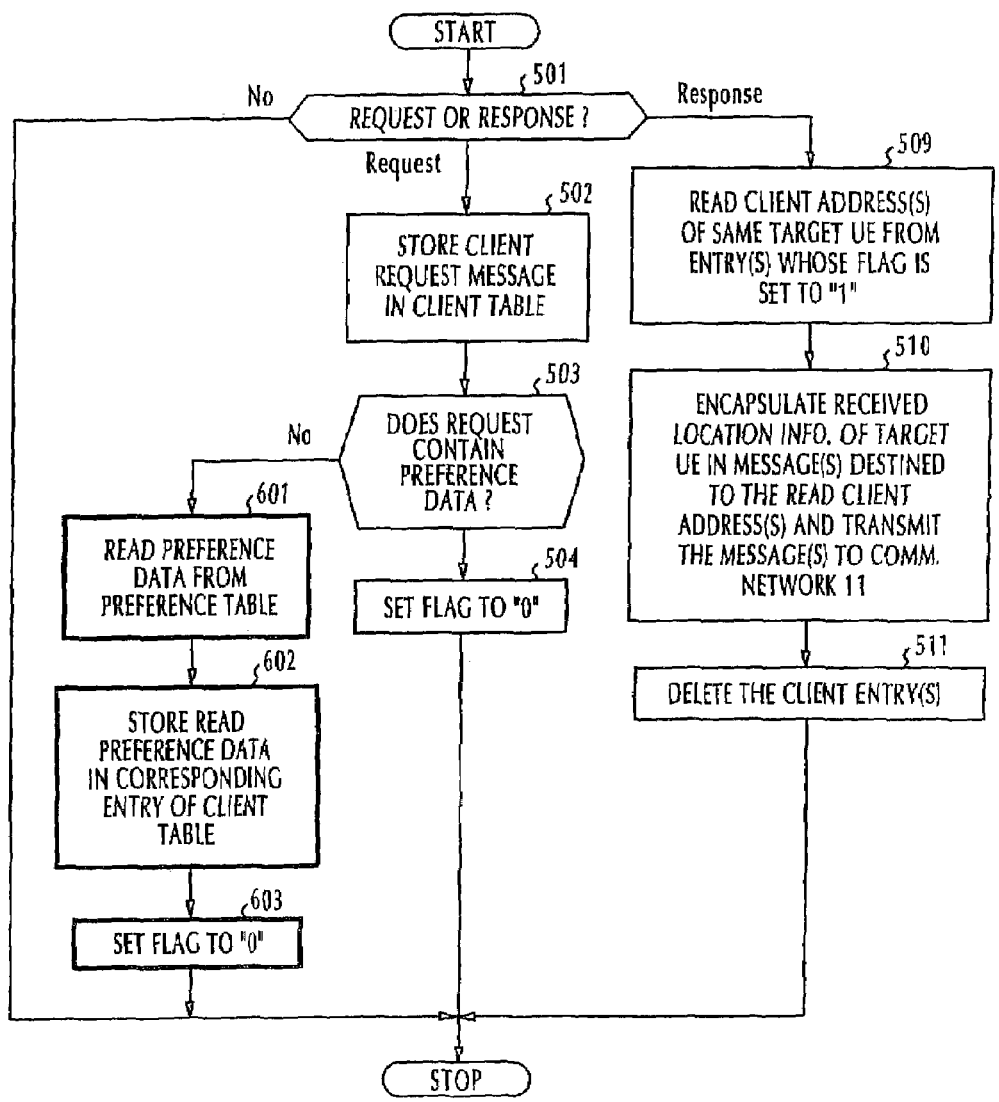

FIG. 8 is a modification of the flowchart of FIG. 7A. In this modification, steps 505 to 508 of FIG. 7A are replaced with steps 601 through 603. If the decision at step 503 is negative, the processor proceeds to step 601 to read preference data from the preference table 27 and stores the read preference data in a corresponding entry of the client table 25 (step 602). Then, the flag field 33 of this entry is set to "0" (step 603), and the routine is terminated. At periodic intervals, the routine of FIG. 7B is repeated to make a search for the client table 25.

FIG. 9 is a further modification of the flowchart of FIG. 7A. In this modification, steps 506 and 507 of FIG. 7A are omitted and steps 509 and 510 are replaced with steps 701 through 704. In response to receipt of a location response message from the location information server 15, the processor proceeds from step 501 to step 701 to make a search through the client table 25 for entries of the same target UE terminal whose flag is either set to "1" or "0" and whose preference data is satisfied in a manner as described. If such entries are detected (step 702), the processor proceeds to step 703 to read addresses from the detected client entries and encapsulate the received location information in multiple messages destined to the read addresses and transmit the messages to the communication network 11 (step 704). Following step 704, step 511 is executed by deleting the appropriate client entries from the client table. At periodic intervals, the routine of FIG. 7B is repeated to make a search for the client table 25.

What is claimed is:

1. A method of operating a gateway with a location information system, comprising the steps of:
   a) receiving a plurality of location request messages from a plurality of client terminals for location information of a mobile terminal, and storing the location request messages in a memory; and
   b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted,
   wherein step (a) comprises:
   $a_1$) creating a plurality of client entries in a memory for mapping addresses of the client terminals to said mobile terminal; and
   $a_2$) setting a flag to "0" in each of said client entries;
   wherein step (b) comprises:
   $b_1$) repeatedly making said search for detecting at least one client entry whose flag is set to "0";
   $b_2$) requesting said location information from the location information system;
   $b_3$) setting the flag to "1" in the client entry for which the location information has been requested;
   $b_4$) reading the address from the client entry whose flag is set to "1" when the location information is received from said system, encapsulating the location information in a reply message destined to the address that has been read, and transmitting the reply message.

2. The method of claim 1, wherein step ($b_2$) comprises requesting said location information from the location information system if multiple client entries are detected by the search or if there is only one client entry detected whose time lapse is expected to exceed a predetermined time-out period when said search is subsequently repeated.

3. A method of operating a gateway with a location information system, comprising the steps of:
   a) receiving a plurality of location request messages from a plurality of client terminals for location information of a mobile terminal, and storing the location request messages in a memory; and
   b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted,
   wherein the location information acquired from the location information system includes auxiliary information,
   wherein step (a) comprises:
   $a_1$) creating a plurality of client entries in a memory for mapping addresses of the client terminals to said mobile terminal;
   $a_2$) setting a flag to "0" in each of said client entries;
   $a_3$) determining whether the at least one location request message contains preference data;
   $a_4$) if the at least one location request message of a client entry contains preference data, setting a flag to "0" in the client entry, and if the at least one location request message does not contain preference data, requesting the location information of said mobile terminal from the location information system and setting a flag to "1" in the client entry; and
   $a_5$) reading the address from at least one client entry whose flag is set to "1" and whose preference data satisfies a condition specified by said auxiliary information when the location information is received from the location information system, encapsulating the location information in a reply message destined to the address that has been read, transmitting the reply message, and deleting said client entry from said memory,
   wherein step (b) comprises:
   $b_1$) repeatedly making a search through said memory at periodic intervals for detecting multiple client entries whose flag is set to "0" and whose preference data satisfies said specified condition or a single client entry whose flag is set to "0" and whose preference data is expected not to satisfy said specified condition when said search is subsequently repeated, and setting the flag of each of said multiple client entries and said single client entry to "1";
   $b_2$) requesting the location information of said mobile terminal from said location information system for said multiple client entries or said single client entry; and
   $b_3$) reading an address from at least one client entry whose flag is set to "1" when the location information is received from the location information system, encapsulating the location information in a reply message destined to the address that has been read, transmitting the reply message and deleting the client entry from said memory.

4. The method of claim 3, wherein step ($a_4$) further comprises the steps of:
   making a search through said memory for detecting at least one client entry whose flag is set to "0" and whose preference data satisfies said specified condition if the location request message does not contain preference data; and
   if said at least one client entry is detected by the search, setting the flag of said at least one client entry to "1".

5. The method of claim 3, wherein step ($a_5$) further comprises making a search through said memory, prior to reading said address, for detecting at least one client entry whose flag is either "0" or "1" and whose preference data satisfies said specified condition.

6. The method of claim 3, wherein said preference data indicates an age of the location information.

7. The method of claim 3, wherein said preference data indicates a degree of accuracy of the location information.

8. The method of claim 3, wherein said auxiliary information indicates a travelling speed of said mobile terminal.

9. The method of claim 3, wherein said auxiliary information indicates a degree of accuracy of the location information.

10. The method of claim 3, wherein said auxiliary information indicates a time of day at which the location information is received from the location information system.

11. A method of operating a gateway with a location information system, comprising the steps of:
   a) receiving a plurality of location request messages from a plurality of client terminals for location information of a mobile terminal, and storing the location request messages in a memory; and
   b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted,
   wherein the location information acquired from said system includes auxiliary information, wherein step (a) comprises:
   $a_1$) creating a plurality of client entries in a memory for mapping addresses of the client terminals to said mobile terminal;
   $a_2$) setting a flag to "0" in each of said client entries;
   $a_3$) determining whether the at least one location request message contains preference data; and
   $a_4$) if the at least one location request message of a client entry contains preference data, setting a flag to "0" in the client entry, and if the location request message does not contain preference data, reading preference data from a memory and storing the read preference data in the client entry, and setting a flag to "0" in the client entry,
   wherein step (b) comprises:
   $b_1$) repeatedly making a search through said memory at periodic intervals for detecting multiple client entries whose flag is set to "0" and whose preference data satisfies said specified condition or a single client entry whose flag is set to "0" and whose preference data is expected not to satisfy said specified condition when said search is subsequently repeated, and setting the flag of each of said multiple client entries and said single client entry to "1";
   $b_2$) requesting the location information of said mobile terminal from said location information system for said multiple client entries or said single client entry; and
   $b_3$) reading an address from at least one client entry whose flag is set to "1" when the location information is received from the location information system, encapsulating the location information in a reply message destined to the address that was read, transmitting the reply message and deleting the client entry from said memory.

12. A computer-readable storage medium storing a program for operating a gateway with a location information system, said program comprising the steps of:
   a) receiving a plurality of location request messages from a plurality of client terminals for location information of a mobile terminal, and storing the location request messages in a memory; and
   b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted,
   wherein step (a) comprises:
   $a_1$) creating a plurality of client entries in a memory for mapping addresses of the client terminals to said mobile terminal; and
   $a_2$) setting a flag to "0" in each of said client entries;
   wherein step (b) comprises:
   $b_1$) repeatedly making said search for detecting at least one client entry whose flag is set to "0";
   $b_2$) requesting said location information from the location information system;
   $b_3$) setting the flag to "1" in the client entry for which the location information has been requested;
   $b_4$) reading the address from the client entry whose flag is set to "1" when the location information is received from said system, encapsulating the location information in a reply message destined to the address that has been read, and transmitting the reply message.

13. The computer-readable storage medium of claim 12, wherein step ($b_2$) comprises requesting said location information from the location information system if multiple client entries are detected by the search or if there is only one client entry detected whose time lapse is expected to exceed a predetermined time-out period when said search is subsequently repeated.

14. A computer-readable storage medium storing a program for operating a gateway with a location information system, said program comprising the steps of:
   a) receiving a plurality of location request messages from a plurality of client terminals for location information of a mobile terminal, and storing the location request messages in a memory; and
   b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted,
   wherein the location information acquired from the location information system includes auxiliary information, wherein step (a) comprises:
   $a_1$) creating a plurality of client entries in a memory for mapping addresses of the client terminals to said mobile terminal; and
   $a_2$) setting a flag to "0" in each of said client entries;
   $a_3$) determining whether the at least one location request message contains preference data;
   $a_4$) if the at least one location request message of a client entry contains preference data, setting a flag to "0" in the client entry, and if the at least one location request message does not contain preference data, requesting the location information of said mobile terminal from the location information system and setting a flag to "1" in the client entry; and
   $a_5$) reading the address from at least one client entry whose flag is set to "1" and whose preference data satisfies a condition specified by said auxiliary information when the location information is received from the location information system, encapsulating the location information in a reply message destined to the address that has been read, transmitting the reply message, and deleting said client entry from said memory, wherein step (b) comprises:

$b_1$) repeatedly making a search through said memory at periodic intervals for detecting multiple client entries whose flag is set to "0" and whose preference data satisfies said specified condition or a single client entry whose flag is set to "0" and whose preference data is expected not to satisfy said specified condition when said search is subsequently repeated, and setting the flag of each of said multiple client entries and said single client entry to "1";

$b_2$) requesting the location information of said mobile terminal from said location information system for said multiple client entries or said single client entry; and $b_3$) reading an address from at least one client entry whose flag is set to "1" when the location information is received from the location information system, encapsulating the location information in a reply message destined to the address that has been read, transmitting the reply message and deleting the client entry from said memory.

15. The computer-readable storage medium of claim 14, wherein step ($a_4$) further comprises the steps of:

making a search through said memory for detecting at least one client entry whose flag is set to "0" and whose preference data satisfies said specified condition if the location request message does not contain preference data; and if said at least one client entry is detected by the search, setting the flag of said at least one client entry to "1".

16. The computer-readable storage medium of claim 14, wherein step ($a_5$) further comprises making a search through said memory, prior to reading said address, for detecting at least one client entry whose flag is either "0" or "1" and whose preference data satisfies said specified condition.

17. The computer-readable storage medium of claim 14, wherein said preference data indicates an age of the location information.

18. The computer-readable storage medium of claim 14, wherein said preference data indicates a degree of accuracy of the location information.

19. The computer-readable storage medium of claim 14, wherein said auxiliary information indicates a travelling speed of said mobile terminal.

20. The computer-readable storage medium of claim 14, wherein said auxiliary information indicates a degree of accuracy of the location information.

21. The computer-readable storage medium of claim 14, wherein said auxiliary information indicates a time of day at which the location information is received from the location information system.

22. A computer-readable storage medium storing a program for operating a gateway with a location information system, said program comprising the steps of:

a) receiving a plurality of location request messages from a plurality of client terminals for location information of a mobile terminal, and storing the location request messages in a memory; and b) making a search through said memory at periodic intervals for detecting at least one location request message, requesting the location information of said mobile terminal from a location information system if there is at least one location request message detected in said memory, transmitting a reply message to the client terminal from which was received the at least one location request message detected in said memory, and deleting from the memory the at least one location request message for which the reply message was transmitted, wherein the location information acquired from said system includes auxiliary information, wherein step (a) comprises:

$a_1$) creating a plurality of client entries in a memory for mapping addresses of the client terminals to said mobile terminal;

$a_2$) setting a flag to "0" in each of said client entries;

$a_3$) determining whether the at least one location request message contains preference data; and $a_4$) if the at least one location request message of a client entry contains preference data, setting a flag to "0" in the client entry, and if the location request message does not contain preference data, reading preference data from a memory and storing the read preference data in the client entry, and setting a flag to "0" in the client entry, wherein step (b) comprises:

$b_1$) repeatedly making a search through said memory at periodic intervals for detecting multiple client entries whose flag is set to "0" and whose preference data satisfies said specified condition or a single client entry whose flag is set to "0" and whose preference data is expected not to satisfy said specified condition when said search is subsequently repeated, and setting the flag of each of said multiple client entries and said single client entry to "1";

$b_2$) requesting the location information of said mobile terminal from said location information system for said multiple client entries or said single client entry; and $b_3$) reading an address from at least one client entry whose flag is set to "1" when the location information is received from the location information system, encapsulating the location information in a reply message destined to the address that was read, transmitting the reply message and deleting the client entry from said memory.

* * * * *